(12) United States Patent
Liu et al.

(10) Patent No.: US 12,367,214 B2
(45) Date of Patent: *Jul. 22, 2025

(54) BLOCKCHAIN NODE AND TRANSACTION METHOD

(71) Applicant: Huawei Technologies Co., Ltd., Shenzhen (CN)

(72) Inventors: Qi Liu, Hangzhou (CN); Jian Ding, Hangzhou (CN); Yanlan Wei, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/501,225

(22) Filed: Nov. 3, 2023

(65) Prior Publication Data

US 2024/0061861 A1 Feb. 22, 2024

Related U.S. Application Data

(63) Continuation of application No. 17/166,718, filed on Feb. 3, 2021, now Pat. No. 11,847,135, which is a (Continued)

(30) Foreign Application Priority Data

Aug. 8, 2018 (CN) .......................... 201810895962.6

(51) Int. Cl.
*G06F 16/27* (2019.01)
*G06F 16/2455* (2019.01)
(Continued)

(52) U.S. Cl.
CPC .......... *G06F 16/27* (2019.01); *G06F 16/2455* (2019.01); *G06F 16/284* (2019.01); *G06Q 20/0658* (2013.01); *G06Q 20/389* (2013.01)

(58) Field of Classification Search
None
See application file for complete search history.

(56) References Cited

U.S. PATENT DOCUMENTS 9,268,834 B2 *  2/2016  Aguilera ............. G06F 16/2445
9,535,948 B1    1/2017  Cuthbert et al.
(Continued)

FOREIGN PATENT DOCUMENTS

CN    106874440 A    6/2017
CN    107103054 A    8/2017
(Continued)

OTHER PUBLICATIONS

Scherer, Mattias, "Performance and Scalability of Blockchain Networks and Smart Contracts," Spring 2017, XP055525046, 46 pages.
(Continued)

*Primary Examiner* — Debbie M Le
(74) *Attorney, Agent, or Firm* — Conley Rose, P.C.

(57) ABSTRACT

A transaction method and a node design in a blockchain system, where a client initiates a transaction using a Structured Query Language (SQL) write command including transaction data or queries transaction data using an SQL query command. A node parses an SQL command, executes a simulated transaction, and checks block data based on a transaction result of the simulated transaction after obtaining the block data. After the check succeeds, the node converts the block data into an SQL write command that writes the block data, thereby writing the block data to a relational database.

20 Claims, 6 Drawing Sheets

Related U.S. Application Data continuation of application No. PCT/CN2019/098607, filed on Jul. 31, 2019.

(51) Int. Cl.
  *G06F 16/28* (2019.01)
  *G06Q 20/06* (2012.01)
  *G06Q 20/38* (2012.01)

(56) References Cited

U.S. PATENT DOCUMENTS

| | | |
|---|---|---|
| 10,552,443 B1 * | 2/2020 | Wu .................... G06F 16/2228 |
| 10,877,962 B2 | 12/2020 | Horii et al. |
| 10,880,075 B2 | 12/2020 | King |
| 11,169,985 B2 | 11/2021 | Innocenti |
| 11,475,437 B2 | 10/2022 | Lee et al. |
| 11,676,139 B2 * | 6/2023 | Mao .................... G06Q 20/401 |
| | | 705/64 |
| 2016/0098723 A1 | 4/2016 | Feeney |
| 2020/0050613 A1 | 2/2020 | Gauvreau, Jr. |

FOREIGN PATENT DOCUMENTS

| CN | 107180350 A | 9/2017 |
|---|---|---|
| CN | 107391649 A | 11/2017 |

OTHER PUBLICATIONS

Antonopoulos, A., et al., "Mastering Bitcoin—Unlocking Digital Crypto-Currencies," OReilly, Dec. 2014, XP055581333, 282 pages.

* cited by examiner

BLOCKCHAIN NODE AND TRANSACTION METHOD

CROSS-REFERENCE TO RELATED APPLICATIONS

This is a continuation of U.S. patent application Ser. No. 17/166,718 filed on Feb. 3, 2021, which is a continuation of International Patent Application No. PCT/CN2019/098607 filed on Jul. 31, 2019, which claims priority to Chinese Patent Application No. 201810895962.6 filed on Aug. 8, 2018. All of the aforementioned patent applications are hereby incorporated by reference in their entireties.

TECHNICAL FIELD

The present disclosure relates to blockchain technologies, and in particular, to a database design of a blockchain.

BACKGROUND

A blockchain is a chain data structure formed by combining data blocks in a sequential connection manner, and is a distributed ledger, where it is ensured, in a cryptography manner, that the ledger is tamper-proof and unforgeable. The blockchain constructs a distributed structure system according to a decentralized protocol, sends value-exchange information to an entire network through distributed propagation, determines information data content through distributed accounting, generates block data after marking a timestamp, and then sends the block data to nodes through distributed propagation, to implement distributed storage.

A smart contract is a new feature generated as a blockchain technology develops. The smart contract is essentially a coding instance of a contract of two transaction parties. The smart contract responds to received information according to a regulation of the contract of the two parties, may receive and store value, and may also output information and value. The smart contract plays a trusted system, and always performs an operation according to a rule agreed on in advance.

In an existing blockchain solution, a key-value (KV) database is used for storage. The KV database is a non-relational database in which data is organized, indexed, and stored in a form of KV pairs. For example, in a BITCOIN system, a storage system includes a common file and the KV database. The common file is used to store blockchain data, and the KV database is used to store blockchain metadata. For another example, in a Hyperledger Fabric system, ledgers include three types of ledgers: a block ledger, a status ledger, and a historical ledger. The block ledger records a transaction record of the smart contract, and stores the transaction record in a file system. The status ledger stores a latest status of data of the smart contract, and stores the latest status in the KV database. The historical ledger stores all indexes of historical records obtained after the smart contract executes transactions, and stores the indexes in the KV database.

In a related application scenario of the smart contract, a relationship between the generated block data is more complex. For the KV database, if a user needs to perform complex query, for example, query a record of a related operation on block data having no keys, the user needs to successively read all block data, and filter the block data one by one. Query efficiency is quite low. In addition, if the user needs to migrate an existing Structured Query Language (SQL)-type application to the blockchain, the user also needs to develop service code of a KV interface again. Learning costs are quite high.

SUMMARY

Embodiments of the present disclosure provide a blockchain system using a relational database (RDB), including a transaction method and a node such that a client can initiate a transaction and complete a query based on an SQL command, and store transaction data and block data in the RDB. Difficulty in developing and being connected to the blockchain system is increased, compatibility between the blockchain system and another system is enhanced, and a data query capability of the blockchain system is improved.

According to a first aspect, an embodiment of the present disclosure provides a blockchain method. The method is performed by a node in a blockchain, and includes obtaining a transaction instruction of a client, where the transaction instruction includes a first SQL write command, and the SQL write command includes transaction data included in a transaction corresponding to the transaction instruction, performing a simulated transaction according to the first SQL write command in the transaction instruction, and checking the block data based on a transaction result of the simulated transaction after obtaining block data, generating a second SQL write command based on the block data after the check succeeds, and instructing an RDB to execute the second SQL write command. An SQL write command is parsed, and a simulated transaction is performed such that an endorsement process based on an SQL command is implemented. In addition, after block data is obtained, the data is checked based on a transaction result, and the block data is converted into an SQL write command and written to an RDB such that the block data is stored in the RDB. Therefore, a transaction process based on an SQL command is implemented, and the block data recording the transaction result is stored in the RDB.

In some implementations, after completing the simulated transaction, the node returns the transaction result of the simulated transaction to the client.

In some other implementations, the node generates block data based on the result of the simulated transaction.

In a possible implementation, before the simulated transaction is performed, endorsement information needs to be obtained from the RDB. In a blockchain system, a process of performing the simulated transaction according to the transaction instruction is referred to as an endorsement process. In some endorsement processes, in addition to information in the transaction instruction, other information further needs to be used. The node may determine, according to the transaction instruction, a first SQL query command used to obtain the endorsement information, and instruct the relational RDB to execute the first SQL query command, thereby obtaining a query result obtained after the RDB executes the first SQL query command, and performing the simulated transaction based on the transaction instruction and the query result.

In a possible implementation, if the endorsement information includes information used to determine whether to execute the simulated transaction, during execution of the simulated transaction, it is determined whether the query result meets a first preset condition. If the query result meets the first preset condition, the simulated transaction is performed according to the transaction instruction. If the query result does not meet the first preset condition, a result that the query result does not meet the preset condition is returned to the client.

}

In another possible implementation, the endorsement information includes information used for the simulated transaction. The node obtains the query result obtained after the RDB executes the first SQL query command, and performs the simulated transaction based on information in the transaction instruction and the query result.

In a possible implementation, when generating the second SQL write command based on the block data, the node converts, based on a KV in information about the block data, the KV into an SQL write command of a corresponding entry in the RDB.

In some other implementations, the node converts the first SQL write command into a KV according to the transaction instruction, and checks the KV.

In some other implementations, when determining a first SQL query command used to obtain endorsement information, the node determines, by converting the SQL write command in the transaction instruction into a KV and based on the KV, the first SQL query command used to obtain the endorsement information.

In an implementation, the transaction result of the simulated transaction is stored in other storage space of the node, for example, a memory, a cache, or another non-RDB. In another implementation, the transaction result of the simulated transaction is stored in the RDB.

In an implementation, the simulated transaction may be implemented directly by performing a write operation on the RDB. Further, in an implementation, the first SQL write command is converted into a KV according to the transaction instruction, and a third SQL write command is determined based on the KV, where the third SQL write command is used to write the transaction result of the simulated transaction to the RDB, and the RDB is instructed to execute the third SQL write command.

In another implementation, a third SQL write command may alternatively be determined directly according to the first SQL write command in the transaction instruction, and the RDB is instructed to execute the third SQL write command.

An SQL command is converted into a KV, or a KV is converted into an SQL command based on the following correspondence: converting an entry in an SQL write command into a corresponding K value, and determining, based on content of the entry, a V value corresponding to the K value. Further, in an implementation, a K value includes a table name, a primary key value, and a column name that are to be written under an SQL command, and a V value includes data corresponding to the primary key value of the column name. In some implementations, such conversion is implemented using a smart contract.

In some implementations, the node may further obtain a query instruction of the client, where the query instruction includes a second SQL query command, instruct, according to the query instruction, the RDB to execute the second SQL query command, and obtain a query result obtained after the RDB executes the second SQL query command. In this way, the client is provided with a function of querying transaction information in the RDB.

In some implementations, the node may further implement a function of avoiding a double-spend transaction. For example, in an implementation, a third SQL query command used to obtain historical transaction information corresponding to the transaction instruction is determined according to the transaction instruction, and the RDB is instructed to execute the third SQL query command, and a query result obtained after the RDB executes the third SQL query command is obtained, and it is determined, based on the query result of the third SQL query command, whether the transaction instruction is a double-spend transaction.

In another implementation, a third SQL query command used to query historical transaction information corresponding to a block is generated based on block information, and the RDB is instructed to execute the third SQL query command, and a query result obtained after the RDB executes the third SQL query command is obtained, and it is determined, based on the query result of the third SQL query command, whether the transaction instruction is a double-spend transaction.

According to a second aspect, an embodiment of the present disclosure further provides a node apparatus in a blockchain system. The apparatus includes one or more functional units configured to implement the foregoing method steps. When the apparatus includes a plurality of functional units, the function units usually correspond one-to-one to the foregoing method steps. For example, an endorsement module is configured to obtain a transaction instruction of a client, where the transaction instruction includes a first SQL write command, and perform a simulated transaction according to the transaction instruction. A check module is configured to obtain block data, and check the block data based on a transaction result of the simulated transaction. A storage module is configured to generate a second SQL write command based on the block data after the check performed by the check module succeeds, and instruct an RDB to execute the second SQL write command. It should be noted that the functional unit may be implemented using only a software program, or using only hardware, or using a combination of software and hardware.

According to a third aspect, an embodiment of the present disclosure further provides a computer system. The computer system is used as a node in a blockchain system. The computer system includes at least one processor and memory. The memory is configured to store a software program. When the software program is executed by the processor, the processor in the computer system is configured to perform the method according to any one of the first aspect or the implementations of the first aspect.

According to a fourth aspect, an embodiment of the present disclosure further provides a storage medium configured to store a computer program. When the computer program is executed by a processor, the processor is configured to implement any method provided in the first aspect. Further, the computer program may include one or more program units configured to implement the steps in the method.

It can be learned that the embodiments of the present disclosure provide the transaction method and the node in a blockchain system such that the client can initiate the transaction and complete the query according to the SQL command, and store the transaction data and the block data in the RDB. Because of usability and wide use of an SQL language, in the embodiments of the present disclosure, the difficulty in developing and being connected to the blockchain system is increased, and the compatibility between the blockchain system and the other system is enhanced. In addition, because the RDB has stronger data query and analysis capabilities, in the embodiments of the present disclosure, data query and processing capabilities of the blockchain system are also improved.

BRIEF DESCRIPTION OF DRAWINGS

To describe the technical solutions in some of the embodiments of the present disclosure more clearly, the following briefly describes the accompanying drawings describing some of the embodiments of the present disclosure.

DESCRIPTION OF EMBODIMENTS

Figure 1:
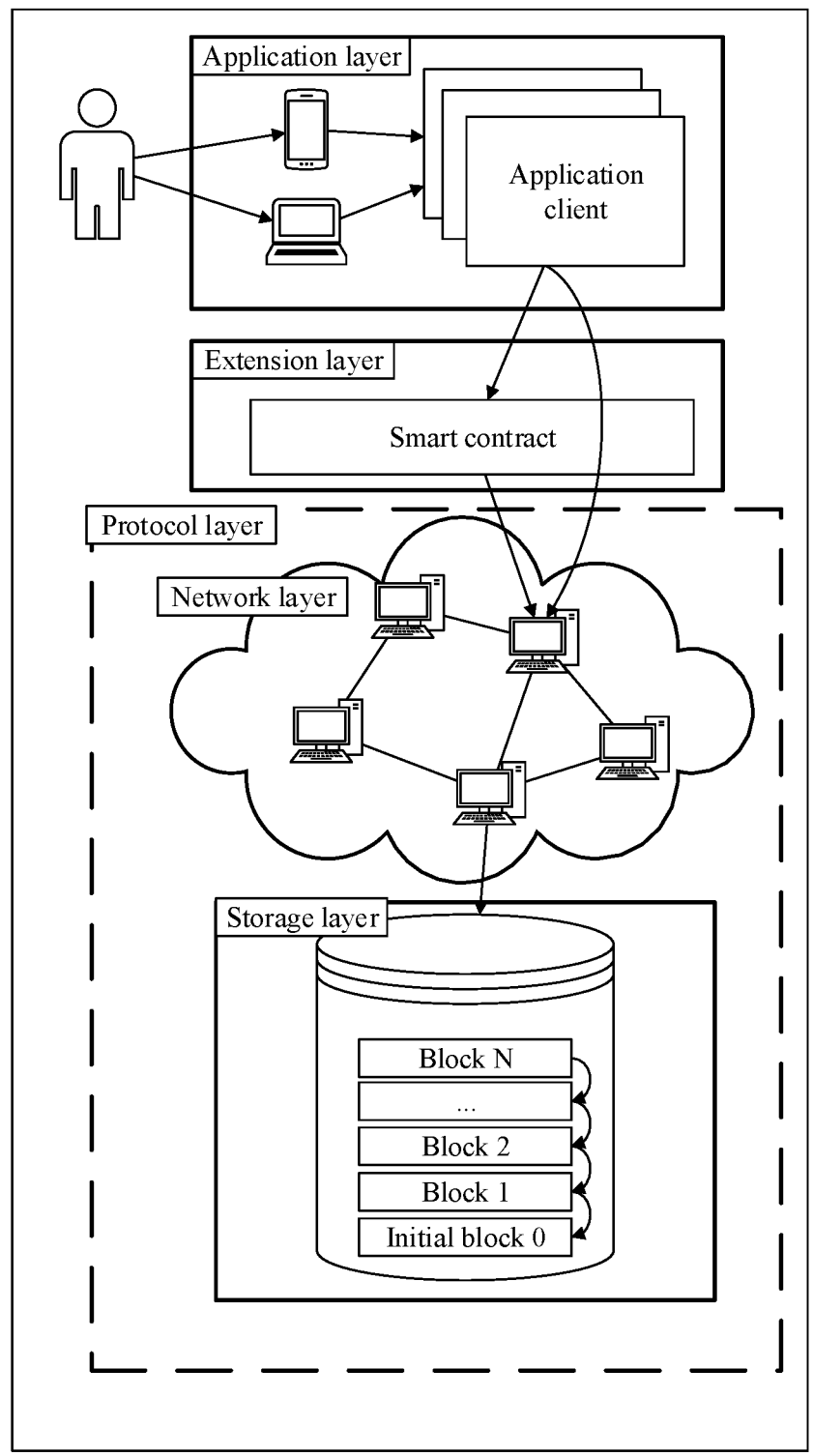
FIG. 1 is a diagram of a system architecture of a blockchain system according to an embodiment of the present disclosure.

The following describes embodiments of the present disclosure with reference to the accompanying drawings in the embodiments of the present disclosure.

To facilitate understanding of the solutions, some concepts in a blockchain network architecture are first described.

Client: A user may implement, using a client in a blockchain system, functions such as creating a chaincode and initiating a transaction. The client may be deployed on any terminal, and is implemented using a corresponding software development kit (SDK) of the blockchain system. The terminal communicates with a node in a blockchain network such that a corresponding function of the client is implemented.

Block: In a blockchain technology, data is permanently stored in a form of electronic records, and a file storing these electronic records is referred to as a "block". Blocks are generated one by one in a chronological order. Each block records all value-exchange activities that occur during creation of the block, and all blocks are aggregated to form a chain record set.

Block structure: Transaction data in a time period for generating the block is recorded in the block, and a main body of the block is actually a set of transaction information. Structure designs of all blockchains may not be completely the same, but a general structure is divided into two parts: a block header and a block body. The block header is configured to link to a previous block, and provide integrity assurance for a blockchain database. The block body includes all records that are verified and that are of value exchanges occurring during block creation.

Node (peer): In the blockchain network, a network system having a distributed structure is constructed such that all data in a database is updated in real time and stored in all network nodes that participate in recording. In addition, the blockchain network constructs an entire set of protocol mechanisms such that each node in the entire network also verifies, when participating in recording, correctness of a result recorded by another node. Only when the protocol mechanisms enable all nodes meeting a condition (for example, all nodes, most nodes, or particular nodes) to consider a record correct, or after all comparison results of all the nodes participating in recording are passed, the authenticity of the record can be recognized in the entire network and recorded data is allowed to be written to the block. Therefore, in the blockchain network, a decentralized distributed database includes all the nodes together.

In different blockchain systems, in addition to a node configured to store block data, some special nodes exist, for example, an endorser and an orderer. The endorser is a state machine that performs a smart contract, and simulates transaction execution. The endorser includes an endorsement policy set specified in advance. A particular chaincode is installed in the endorsement policy set. All transactions need to be performed according to endorsement policies, because only a transaction processed through endorsement is valid and recognized. During specific implementation, after receiving a transaction request of the client, the endorser executes a simulated transaction, and generates an endorsement signature based on a result of the simulated transaction, thereby completing endorsement of the transaction.

Smart contract: A smart contract is a computer protocol intended to propagate, verify, or execute a contract in an informatization manner. The smart contract is essentially implemented using computer code triggered by transaction behavior. In different blockchain systems, implementation of the smart contract is different. For example, in an Ethereum system, behavior in the smart contract is controlled by code. Therefore, an account of the smart contract stores a status of the contract. On Ethereum, a core is an Ethereum virtual machine (EVM), and the contract code is executed in the EVM. Certainly, each node has an EVM, and the EVM is a Turing complete virtual machine. In a fabric system, the smart contract is referred to as a chaincode, and chaincodes are classified into a system chaincode and a user chaincode. The system chaincode is used to implement a function at a system layer, and the user chaincode implements an application function of the user. The chaincode is compiled into an independent application program, and is run in an isolated docker container. Compared with the Ethereum, the fabric chaincode is separated from an underlying ledger. During chaincode upgrade, ledger data does not need to be migrated to a new chaincode. This really implements separation between logic and data. In addition, the chaincode is written in Go, Java, and Nodejs languages.

RDB: An RDB is a relational model-based database. In a computer, the RDB is a set of data and database objects. The database objects refer to a table, a view, a storage process, a trigger, and the like. Computer software for managing the RDB is an RDB management system (RDBMS). The RDB includes data tables and a relationship between the data tables. In the RDB, an association between the tables is a quite important component. The association between the tables means that the data tables in the database are connected using corresponding fields.

FIG. 1 is a diagram of an architecture of a blockchain system according to an embodiment of the present disclosure. As shown in the figure, the architecture of the blockchain system in this embodiment of the present disclosure is divided into three layers, including a protocol layer, an extension layer, and an application layer. The protocol layer may be further divided into a storage layer and a network layer. In different specific blockchain systems, specific implementations of all the three layers of architectures may be different. In this embodiment, only a basic architecture of the blockchain system is described.

The protocol layer provides an underlying capability of the blockchain system, maintains a network node, and generally provides only an application programming interface (API) for invocation. The protocol layer constructs a network environment of the blockchain system, establishes a transaction channel, and formulates a node reward mechanism or a consensus mechanism. Technically, the protocol layer mainly includes aspects such as network programming, a distributed algorithm, a cryptographic signature, and data storage.

In terms of functions and technologies, the protocol layer may be further divided into the network layer and the storage layer. A data layer mainly describes a storage form of blockchain data. The storage form includes chain storage technologies of block data that include a timestamp technology, a hash check technology, and the like, and further includes an implementation of a database and an implementation of invoking an interface of the database by a node.

A main objective of the network layer is to implement information communication between nodes in a blockchain network. The blockchain network is essentially a point-to-point (P2P) network. Each node receives information, and generates information. Communication between the nodes is kept by maintaining a common blockchain. In the blockchain network, the node may create a new block, and other nodes are notified in a broadcast manner after the new block is created. The other nodes verify the block. After all the nodes in the blockchain network reach a consensus, the new block may be added to a main chain.

The extension layer is above the protocol layer. The extension layer provides function implementation of the blockchain system that is based on the protocol layer. The extension layer can implement various script code, algorithm mechanisms, and application mechanisms using the basic capability provided by the protocol layer. For example, a smart contract is typical application of the extension layer. The node automatically executes, using a deployed smart contract, the contract after a condition is met. For another example, at the extension layer, a transaction market of virtual currencies specifies, through script encapsulation, a transaction manner of the virtual currencies and implementation details in a process.

The application layer is above the extension layer, and encapsulates various application scenarios and cases of a blockchain. The application layer implements, mostly in a form of a client, a blockchain function of directly interacting with a user.

In some embodiments of the present disclosure, an RDB is used as a database for data storage at the data layer, and adaptively, a smart contract used for conversion and generation of an SQL command is added to the extension layer such that in the blockchain system, the application layer can initiate a transaction using the SQL command, and finally store the block data and a transaction record in the RDB.

Figure 2:
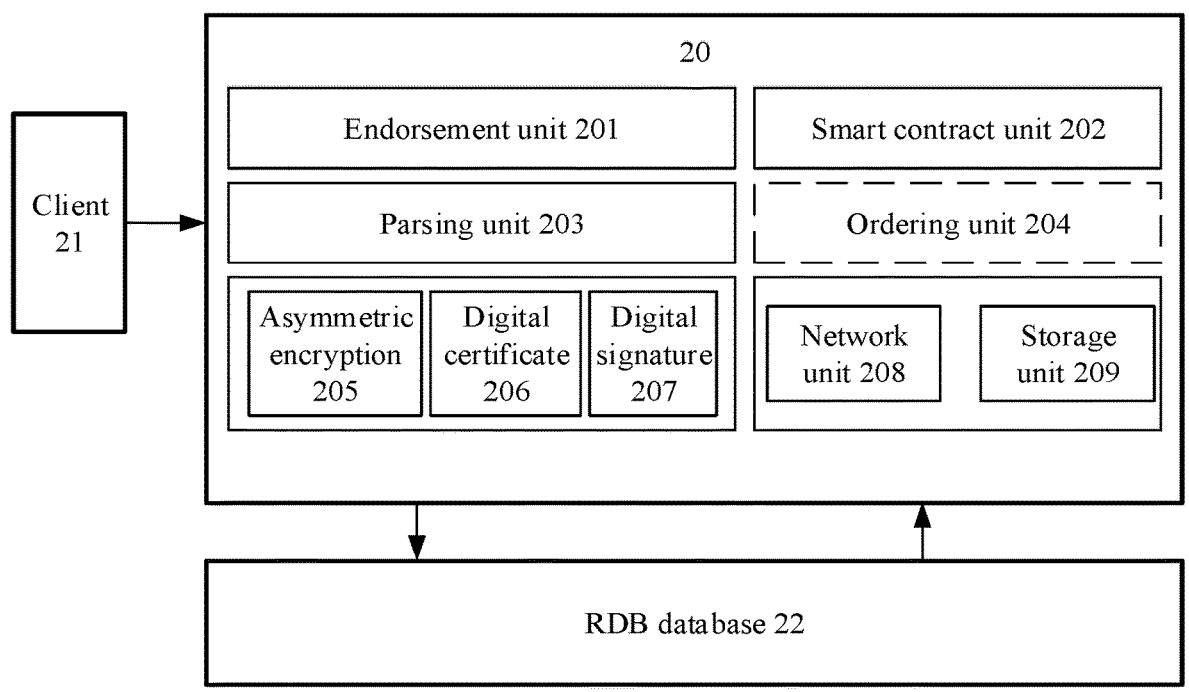
FIG. 2 is a diagram of a logical architecture of a node in a blockchain system according to an embodiment of the present disclosure.

FIG. 2 is a diagram of a system architecture of a node in a blockchain system according to an embodiment of the present disclosure. As shown in the figure, the blockchain node is a decentralized node in a decentralized distributed system of a blockchain. The blockchain node 20 is connected to a client 21, processes a transaction instruction initiated by the client, executes a transaction in the blockchain system, and stores a transaction result. In the node, an endorsement unit 201 is configured to complete an endorsement operation. A smart contract unit 202 is configured to store and execute a smart contract. A parsing unit 203 is configured to parse a received transaction instruction. In some implementations, an orderer 204 is needed in the blockchain system, and a node having an ordering function further includes an ordering unit configured to receive transactions that carry an endorsement signature and that are sent by another node, and pack the transactions into block data in order. The node further includes an asymmetric encryption unit 205, a digital certificate unit 206, or a digital signature unit 207, to implement a corresponding function of the blockchain system, a network unit 208 that process data transmission with another node, and a storage unit 209 configured to store a transaction in the database.

In this embodiment of the present disclosure, the node is connected to an RDB 22, and the smart contract, the parsing unit, the endorsement unit, and the storage unit are improved such that the node can directly process a transaction instruction carrying an SQL command, and store transaction information in the RDB.

Figure 3:
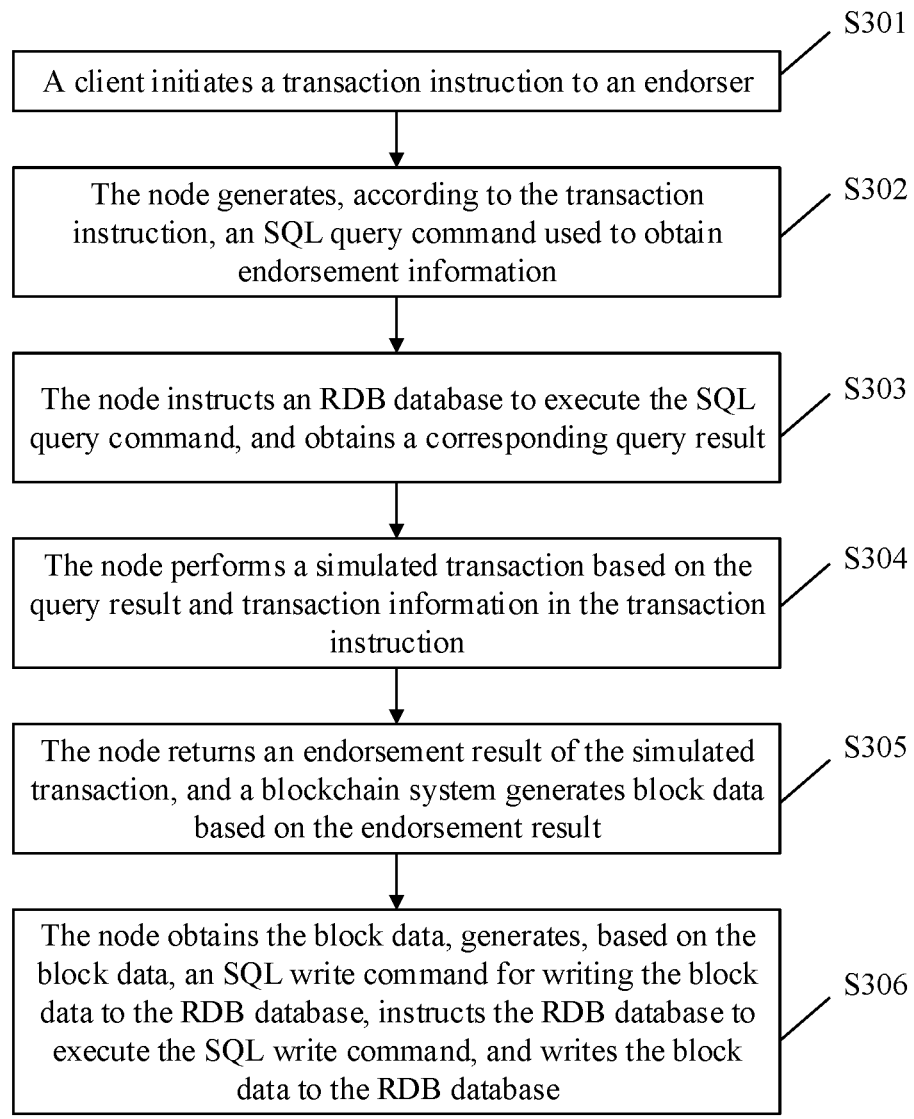
FIG. 3 is a flowchart of a transaction method in a blockchain system according to an embodiment of the present disclosure.

FIG. 3 is a schematic flowchart according to an embodiment of the present disclosure. This embodiment is applied to the blockchain system shown in FIG. 1. The process method describes how to generate block data and transaction data and store the block data and the transaction data in a database of a data node using a transaction instruction once in a blockchain system in this embodiment. In this embodiment, with reference to different blockchain systems, different node roles may be implemented by a same node, or may be implemented by different nodes. For example, in some blockchain systems, an endorser and a data node are a same node. To be specific, the same node can implement both a function of the endorser and a function of the data node. For another example, in some blockchain systems, some data nodes are not used as endorsers. To be specific, such nodes have only a function of the data nodes but do not have a function of the endorsers. For another example, in some blockchain systems, an orderer and an endorser are a same node.

The method in this embodiment includes the following steps.

S301: A client initiates a transaction instruction to a node.

In an implementation, the client is deployed on another terminal separated from the node. After a user performs a transaction operation using the client, the terminal sends the transaction instruction to the node, and the endorser receives, using a network layer, the transaction instruction sent by the terminal. In another implementation, the client is deployed on the node. In this case, after a user performs a transaction operation using the client, the endorser may directly obtain the transaction instruction generated by the transaction operation.

The transaction instruction generated on the client includes an SQL write command, used to instruct to perform a transaction once. In a conventional blockchain system, a transaction instruction is usually implemented by constructing a Funco function for a service based on an API provided by a node. A node in the conventional blockchain system uses a KV database. Therefore, a client needs to separately design a corresponding Funco function based on the API provided by the node, and development is more difficult. In this embodiment, the transaction instruction includes the SQL write command. To be specific, the client directly generates, based on a transaction to be performed, the SQL write command for operating a database used to store the block data. The following provides an example of the SQL write command included in the transaction instruction in this embodiment of the present disclosure:

insert into table name 1 (primary key 1, primary key 2, . . . , colname 1, colname 2, . . . ) values (pkv 1, pkv 2, . . . , colv 1, colv 2, . . . ).

In the foregoing SQL command, the transaction instruction of the client instructs to write to a table name 1 table storing transaction information, and write a corresponding value to an entry of the table.

In some blockchain systems, after receiving the transaction instruction, the endorser needs to check the transaction instruction.

In a blockchain system, checking a KV in the transaction instruction refers to checking validity of the KV. For example, in some implementations, a K key value needs to be checked, to determine whether the K key value conflicts with historical transaction data of a corresponding transaction. Alternatively, in some implementations, a V value is checked, to determine whether the V value conflicts with a data format in historical data. The check on the KV is different during specific implementation of different blockchain systems. An implementation may be determined based on application of this embodiment of the present disclosure in a specific blockchain system. In this embodiment of the present disclosure, the transaction instruction is converted into the KV and then is checked such that a check module of a transaction instruction in an original blockchain system may not be changed, and this embodiment of the present disclosure can be more easily applied to different blockchain systems.

In an implementation, the transaction instruction may be checked directly according to the SQL write command. In this manner, the SQL write command is parsed, to determine whether the SQL write command meets a preset check condition.

In an implementation, the SQL write command in the transaction instruction may be further converted into a KV, and the KV is checked. In this implementation, a node may use a method for checking a KV in other approaches.

In this implementation, compared with the check method used by a node in the other approaches, the node does not need to reconstruct a check module, and only needs to add a set of modules configured to convert an SQL command into a KV. In an implementation, the conversion function may be implemented using a smart contract. After receiving the transaction instruction, the endorser triggers the smart contract for converting the SQL command into the KV, thereby converting the SQL write command into the KV.

In an implementation, converting the SQL command into the KV includes determining, according to the SQL write command, a K value corresponding to an entry in the write command, and determining, based on content of the entry, a V value corresponding to the K value. Further, in an implementation, primary key information is declared in transaction information. A K value includes a table name, a primary key value, and a column name that are to be written. A V value includes values of a column corresponding to the primary key value to be written. The following provides an example of converting the SQL write command in the foregoing example:

Key: table name 1 0x00FF pkv 1 0x00FF pkv 2 0x00FF . . . colname 1 0x00FF co/name 2 . . . Value: colv 1 0x00FF colv 2 . . .

In the foregoing KV value, 0x00FF is a delimiter. In different embodiments, different delimiters may be used for replacement.

The SQL command is converted into the KV using the smart contract, and after the SQL command is converted into the KV, the KV may be checked in a manner consistent with an existing blockchain technology. Therefore, in some implementations, this step may be implemented by only adding the smart contract for converting the SQL command into the KV, without changing another function architecture of the endorser.

S302: The node generates, according to the transaction instruction, an SQL query command used to obtain endorsement information.

When performing an endorsement operation, the node needs to perform simulated transaction, and then generate a signature. In some implementations, during the simulated transaction, in addition to the transaction information included in a transaction instruction, the endorsement information further needs to be obtained. The endorsement information may be external information used to determine whether the transaction meets a condition, or may be related transaction data required for executing the transaction. In some other implementations, the node may alternatively execute the simulated transaction based on only the transaction information included in the transaction instruction. In this case, steps S302 and S303 may be omitted.

In an implementation, the endorser directly determines, according to the SQL write command in the transaction instruction, the endorsement information required for the transaction.

In another implementation, the endorser determines, using the KV into which the SQL write command is converted, the endorsement information required for the transaction.

That the endorser determines, according to the transaction instruction, the endorsement information corresponding to the transaction may be directly adding a corresponding execution condition of the write command to the SQL command of the transaction instruction, and obtaining, based on the execution condition, the endorsement information corresponding to the condition, or writing, using the smart contract, an execution condition corresponding to the transaction or a query function of external information required for the transaction, and triggering, using the transaction instruction, execution of the smart contract, to obtain the endorsement information corresponding to the transaction.

In some implementations, generating, according to the transaction instruction, the SQL query command used to obtain the endorsement information is implemented by triggering a particular smart contract.

S303: The node instructs an RDB to execute the SQL query command, and obtains a corresponding query result.

In some implementations, the RDB is deployed on the node, the node directly invokes the deployed RDB to execute the query command, and obtains the query result. In some other implementations, the RDB is deployed at a remote end, the node sends an instruction including the SQL query command to the RDB, and receives the query result sent by the database after the database executes the query command.

S304: The node performs the simulated transaction based on the query result and the transaction information in the transaction instruction.

In an endorsement process of the blockchain system, the simulated transaction means that in the node, execution of the transaction in the blockchain system is simulated based on the transaction information, and a transaction result is recorded.

In some implementations, if the endorser does not query the endorsement information, the simulated transaction is directly performed based on the transaction information in the transaction instruction. For example, in some transactions in which only information write is performed, a transaction condition does not need to be determined using the endorsement information, and the transaction result does not need to be determined based on historical transaction information such that the simulated transaction is directly performed provided that a write operation is performed based on write information.

In an implementation, when the query result is determining whether the transaction meets external information of a preset condition, whether the query result meets the preset condition is first determined during execution of the simulated transaction. If the query result meets the preset condition, the transaction is simulated based on the transaction information in the transaction instruction.

In an implementation, when the query result is data required for executing the simulated transaction, during execution of the simulated transaction, the transaction is simulated based on the transaction information in the transaction instruction and the data in the query result.

After the simulated transaction is completed, a result of the simulated transaction is obtained. The result of the simulated transaction is a result obtained after a dataset related to the transaction is read/written after the transaction is executed in the blockchain system. For example, when the transaction is a transaction such as a financial transfer, the result of the simulated transaction may include an account balance status of two transfer parties after the transaction ends. For another example, when the transaction is an identity evidence preservation operation, the result of the simulated transaction may include a change status of a database that is after the evidence preservation operation. It may be understood that simulated transactions and results of the simulated transactions are different in different blockchain systems and different application scenarios of the systems, and may be designed and implemented based on a specific application scenario of this embodiment of the present disclosure.

In some implementations, the simulated transaction may be completed by performing a write operation on a database. In a specific implementation, the endorser stores the transaction information in the transaction instruction in a corresponding entry in the RDB, to form a record of the transaction result of the simulated transaction performed by the endorser. In another specific implementation, the transaction information of the endorser may alternatively be stored in another database or a memory, to form a record of an operation result of the simulated transaction performed by the endorser.

In some implementations, when the simulated transaction of the transaction is completed using the write operation on the database, the write operation is performed based on the KV into which the SQL write command in the transaction instruction is converted, to complete the simulated transaction. Further, after the SQL write command in the transaction instruction is converted into the corresponding KV, the simulated transaction is executed based on the KV. In this implementation, because the simulated transaction is determined based on the KV, an execution manner of the simulated transaction is consistent with a manner in which a node in an existing blockchain system executes a simulated transaction. When this implementation of this embodiment of the present disclosure is implemented, the method and the method for the simulated transaction in the existing blockchain system may be better joined. In addition, a data format of the transaction result of the simulated transaction can be consistent with a data format of a result of a transaction executed based on transaction information included in the block data.

S305: The node returns an endorsement result of the simulated transaction, and the blockchain system generates block data based on the endorsement result.

After the node completes the simulated transaction, the blockchain system generates, based on the result of the simulated transaction, the block data including the transaction information of the transaction.

In different blockchain systems, processes of generating the block data based on the endorsement result are different, and node interworking processes in the generation processes are also different. In this embodiment, how to generate the block data based on the endorsement result is not limited. To be specific, when this embodiment is applied to the specific blockchain system, generating the block data based on the endorsement result is implemented with reference to a block data generation process in the blockchain system.

For example, in an implementation, the node returns the transaction result of the simulated transaction and a signature based on the result of the simulated transaction to the client. After collecting signatures of the endorser that meets a condition, the client sends, to an orderer (orders), transaction data including transaction content, transaction results, and the signatures. After receiving the transaction data, the orderer orders the transaction data of different transactions, and packs the transaction data into the block data in an ordering sequence. The packed block data is broadcast to another node.

In another implementation, after performing the simulated transaction, the node contends for permission to pack the block data with other nodes. After it is determined, using a consensus algorithm, that the node obtains the permission to pack the block data, the node packs the transaction data of the simulated transaction into the block data in order, and distributes the block data to the other nodes.

S306: The node obtains the block data, generates, based on the block data, the SQL write command for writing the block data to the RDB, instructs the RDB to execute the SQL write command, and writes the block data to the RDB. If the node executes the simulated transaction, before generating the SQL write command, the node checks the block data based on the transaction result of the simulated transaction, and generates the SQL write command only after the check succeeds.

In different blockchain systems, the data node may be coupled to a role of another node in the systems. Therefore, block data obtained by the data node may be generated by the node, or may be obtained block data that is broadcast by the other node. For example, in some cases, the endorser is the data node, and there is no orderer. To be specific, after the endorser completes endorsement, the node may generate and store the block data. To be specific, the block data may be generated by the node, and does not need to be obtained from another node, or the data node receives block data sent by another data node. In some other blockchain systems, the block data may be generated by the orderer, and the orderer may also be used as the data node to store the block data. In addition, another data node may receive block data sent by the orderer, thereby obtaining the block data.

In some cases, some data nodes do not have an endorsement function. To be specific, the nodes do not perform the simulated transaction. After obtaining the block data, the data nodes may directly generate the SQL write command based on the block data, thereby storing the block data in the RDB. In some other cases, some data nodes have an endorsement function. To be specific, the data nodes execute the simulated transaction. After obtaining the block data, the nodes first check the block data based on the transaction result of the simulated transaction, and then generate an SQL write command based on the block data, thereby storing the block data in the RDB.

The RDB of the node is configured with tables that are obtained through decomposition based on the block data and that are used to store the block data. For example, in an implementation, a block header may be set to be a table, and a block body may be set to be a table. In some particular systems, a data table specific to each of the systems may be further set. For example, in a fabric system, block metadata may be set to be a table, a block header of the block data may be set to be a table, and a block body of the block data may be set to be a table.

In an implementation, when storing the received block data, the node may convert, based on the foregoing mutual conversion relationship, a KV included in the block data into an SQL write command of a corresponding entry, and instruct the RDB to execute the write command, thereby writing the block data to the RDB.

The node performs a check based on the transaction result of the simulated transaction and the transaction information in the block data, and determines consistency between the transaction information recorded in the block data and the transaction result of the simulated transaction, thereby detecting whether the transaction information in the block data collides or is tampered with.

In an implementation, after performing the simulated transaction in step S305, the node stores the transaction result of the simulated transaction in cache space or another non-RDB, and the node performs a check based on the stored transaction result and the transaction information in the block data.

In another implementation, after performing the simulated transaction in step S305, the endorser stores the transaction result of the simulated transaction in the RDB as intermediate data, and performs a check based on the transaction result stored in the RDB and the transaction information in the block data. After the check succeeds, when the write command used to write the block data to the RDB is generated, in an implementation, in the foregoing manner, the block data may be converted into the SQL write command, and written to a table storing the transaction information of the transaction, or the transaction result of the simulated transaction may be stored in a storage manner of the block data in the RDB, and after the check succeeds, the SQL write command may instruct the RDB to dump the transaction result of the simulated transaction that is stored in a table used to store the transaction information of the simulated transaction to a table used to store the transaction information of the transaction, or the SQL write command may instruct the RDB to mark a stored transaction result of a simulated transaction, where the marker is used to indicate that the transaction result is a transaction result of a completed transaction such that the transaction result of the transaction is stored.

In this embodiment, the RDB may be designed in a plurality of implementations. For example, for a write command once, to-be-written data may be stored in one table, or may be stored in a plurality of associated tables. For write commands for different types of data, the data may be stored in different tables, or may be stored in a same table. To be specific, in this embodiment, a design of each data table used to store the transaction data or the block data in the RDB is an example. During specific implementation, different tables and entries may be designed based on specific requirements to store data. In addition, an RDB used to store the block data and an RDB used to store the transaction data may be a same database or different RDBs. To be specific, in this embodiment of the present disclosure, nodes in different blockchains only need to store data of the nodes using storage space in the RDB that is independent of each other. However, in a specific implementation, a plurality of nodes may share one RDB, or one node uses a plurality of different RDBs. When one node uses a plurality of different RDBs, in the description of this embodiment of the present disclosure, the plurality of RDBs are still referred to as RDBs of the node. The node may store data in the different RDBs based on different data types, for example, store the transaction data in an RDB, and store the block data in another RDB. In this embodiment of the present disclosure, the foregoing data storage operations are all referred to as storing in the RDBs of the node. To be specific, the foregoing SQL data write manner and the design of the table used to store data in the RDB may be designed and changed based on a specific blockchain system and blockchain data that needs to be stored.

In some implementations of this embodiment of the present disclosure, the client may perform information query on the node using the SQL query command. After receiving an SQL query command sent by the client, the node directly instructs the RDB to execute the SQL query command, or generates a new SQL query command based on the SQL query command of the client or splits the original SQL query command of the client into a plurality of SQL query commands, and instructs the RDB to execute the commands, thereby obtaining a query result of the query command of the client.

In addition, in this embodiment of the present disclosure, the node may further avoid a double-spend transaction using some processes.

In an implementation, the endorser may query transaction information in the RDB based on information in the transaction instruction, thereby determining, by comparing historical transaction information with the information in the transaction instruction, whether a transaction is a double-spend transaction. Further, various existing check manners that avoid a double-spend transaction may be used.

In another implementation, after obtaining the block data, a data node may query the historical transaction information in the RDB based on the transaction information in the block data, thereby determining, by comparing the historical transaction information with the transaction information in the block data, whether a transaction is a double-spend transaction.

In some implementations of this embodiment of the present disclosure, to reduce a change to an existing architecture of an existing blockchain when the present disclosure is applied to the blockchain system, mutual conversion between the KV and the SQL command and the step of instructing the RDB to perform a write or query operation in this embodiment of the present disclosure may be implemented using the smart contract. In this implementation, after the SQL command in the transaction instruction is converted into the KV using the smart contract, a step such as a check is performed in an original manner of the blockchain system, and endorsement is performed. When the endorsement information in the RDB needs to be obtained in the endorsement operation, the RDB is accessed using the smart contract, to obtain the corresponding endorsement information. After the endorsement is completed, an endorsement result is returned according to steps of the blockchain system to which the present disclosure is applied, to perform a consensus step and generate the block data. After receiving the block data, the data node converts the KV in the block data into the SQL command using the smart contract, and stores the block data in the SQL database.

According to this embodiment of the present disclosure, the client may initiate the transaction instruction using the SQL command, and a blockchain node may operate the RDB according to the transaction instruction, thereby storing the block data and the transaction result in the RDB. Compared with the other approaches in which the KV database is used to store data, in this embodiment of the present disclosure, the RDB is used such that complexity of initiating the transaction instruction by the client is reduced, and query efficiency of a block node database is increased.

Figure 4:
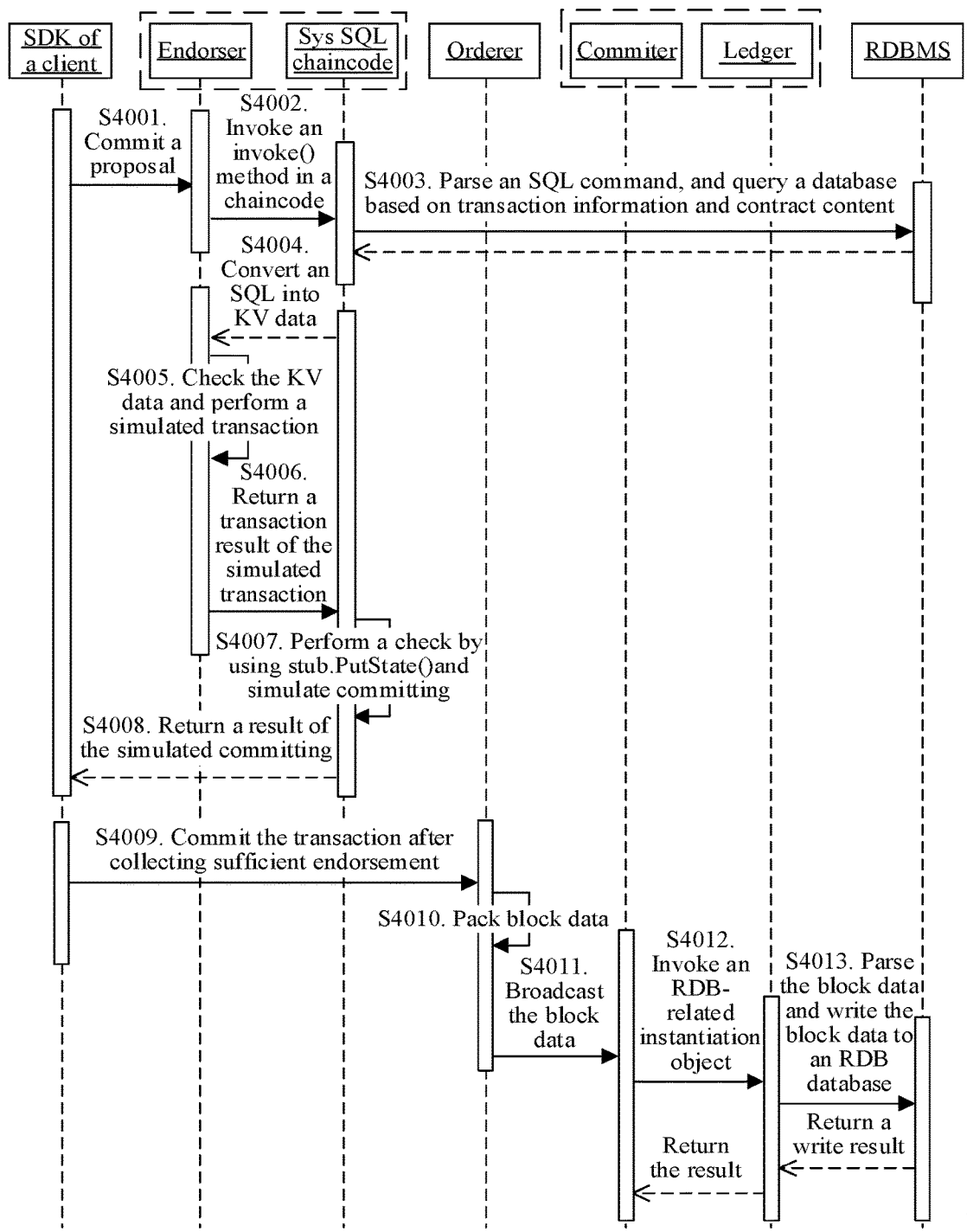
FIG. 4 is a timing diagram of a transaction method in a fabric system according to an embodiment of the present disclosure.

FIG. 4 shows another embodiment of the present disclosure. In this embodiment, a fabric system is used as an example to describe an implementation applied to the fabric system in the present disclosure. It may be understood that this embodiment is an example of specific implementation of the previous embodiment in a blockchain system, and some implementations in the foregoing embodiment may not be implemented in this embodiment. A person skilled in the art may obtain, with reference to the example in this embodiment, an implementation of applying the previous embodiment to another blockchain system.

In this embodiment, a node stores chaincodes and a chaincode execution engine. The chaincodes are an implementation of a smart contract in the fabric system. The chaincodes include a default chaincode and a user-defined chaincode. The default chaincode is mainly responsible for completing a simulated transaction, endorsement, signature, and the like. The user-defined chaincode is developed by a user based on a service requirement, for example, complex query and construction of a user-defined table. The chaincode execution engine is responsible for executing the chaincodes, to query an RDB and update data in the RDB.

In this embodiment, an RDB is configured for each node. The database may be deployed on the node, and may be deployed on another entity other than the node, for example, deployed on a cloud storage database connected to the node. Databases of different nodes may also be deployed on a same entity. For example, a plurality of nodes shares one storage node such that all databases of the plurality of nodes are deployed on the storage node. However, each node needs to be connected to an independent database, and the databases of the different nodes are independent of each other.

Table 1 shows an example of a design of the RDB of the node in this embodiment. A status ledger (world_state) stores world state data in an original fabric system. A historical ledger (world_state_history) stores each modification record of the world state data. A block header (block_header) of a block ledger, block data (block_data) of the block ledger, and metadata of the block ledger (block_metadata) jointly store data in an original block.

TABLE 1

| Table Name | Field | Meaning |
|---|---|---|
| Status ledger (World_state) | namespace | Smart contract name |
| | wkey | Correspond to a key value of kv data in a world_state in an original levelDB |
| | wvalue | Correspond to a value value of the kv data in the world_state in the original levelDB |
| | isDelete | isDelete information of the kv data in the world_state in the original levelDB |
| | block_number | Number of a block in which the kv value is modified |
| | tx_data_num | Number of a transaction in which the kv value is modified |
| Historical ledger (World_state_history) | namespace | Smart contract name |
| | wkey | Each piece corresponds to each modification of a key value of kv data in a world_state in an original levelDB |
| | wvalue | Each piece corresponds to each modification of a value value of the kv data in the world_state in the original levelDB |
| | isDelete | Each piece corresponds to each modification of isDelete information of the kv data in the world_state in the original levelDB |
| | block_number | Number of a block in which each modification occurs |
| | tx_data_num | Number of a transaction in which each modification occurs |
| Block header of a block ledger (block_header) | number | Block number |
| | previous_hash | Hash value of a previous block on a chain |
| | data_hash | Hash value of a current block |
| Block data of a block ledger (block_data) | block_number | Block number |
| | tx_data_num | Transaction number |
| | tx_data | Detailed transaction data |
| | tx_id | Hash value of transaction content |
| | tx_channelId | ID of a channel storing transaction data |
| | tx_timestamp_nanos | Transaction timestamp |
| | tx_validation_code | Transaction validation |
| | Chaincode_name | Smart contract name |
| Metadata of a block ledger (block_metadata) | block_number | Block number |
| | metadata | Detailed metadata information |

The following modules are stored in the chaincodes in the node and are implemented by the chaincodes using the chaincode execution engine.

BlockRDBStore Module:

The module implements an interface for declaration of block storage, and is configured to manage storage and read of and access to original block data in a ledger, parse transaction data in a block into data structures for storing the block_header, the block_data, and the block_metadata, and write the data structures to the block_header, block_data, and block_metadata tables in the RDB.

VersionRDBStore Module:

The module is configured to parse block data into a data structure for storing the world_state, and write the data structure to the world_state table.

HistoryRDBStore Module:

The module is configured to parse block data into a data structure for storing the world_state_history, and write the data structure to the world_state_history table.

The foregoing modules receive a KV pair in a particular data format in the block data, where the KV pair complies with a format rule of the following correspondence:

key=0x00+table name+0x00+value of primary key 1+0x00+value of primary key 2+0x00 . . . ; and value=value of non key column 1+0x00+value of non key column 2+0x00+ . . . +0x10ffff+0x00.

In the foregoing correspondence, 0x00 is a delimiter, and may be replaced with a delimiter in another format during specific implementation.

With reference to FIG. 4, based on the foregoing node and RDB design, in this embodiment, a client may initiate a transaction by sending an SQL command. Details are as follows.

S4001: An SDK of the client initiates the transaction, and sends a transaction instruction (proposal) including an SQL write command to an endorser.

An endorsement request includes an insert command in an SQL language. For example, a transaction of changing a balance is initiated, and the transaction instruction may be insert into account (name, balance) values (David, 100).

S4002: The endorser receives the transaction instruction sent by the client, and invokes an invoke( ) method in a chaincode and triggers an SQL parsing method in a chaincode engine using method parameters in the transaction of the endorser.

S4003: The chaincode engine parses the SQL, and sends a query instruction to the database based on transaction information in the transaction instruction and content of the chaincodes, to query endorsement information.

S4004: The chaincode engine converts the SQL into KV data, to generate the KV pair in the particular data format. For example, the foregoing enumerated transaction instruction insert into account (name, balance) values (David, 100) may be converted in the format rule, to obtain key: account0x00David0x00balance, value: 100.

S4005: The endorser checks a KV based on the KV data obtained through the conversion, and performs a simulated transaction.

S4006: The endorser returns a result of the simulated transaction to the chaincode engine.

S4007: The endorser invokes stub.PutState( ) of a chaincode engine, checks the transaction result of the simulated transaction, and simulates committing of the transaction result.

S4008: The endorser returns a result of the simulated committing to the client.

S4009: After collecting sufficient endorsement, the client commits the transaction to an orderer.

S4010: After performing global ordering on the transaction, the orderer broadcasts block data formed through combination to a data committer.

S4011: After verifying a block, the committer invokes an RDB-related instantiation object of a ledger to process the block.

S4012: In the ledger, an object that operates an RDB storage process initiates parsing of the block data, to form RDB storage structure-based data and an SQL statement of operation data. A connector for connecting RDBMs is invoked to connect databases, parsed data is stored in the databases, and an operation result is returned.

In addition, if the committer is also used as the endorser, after obtaining the block, the committer determines, by performing a check based on the transaction result of the simulated transaction and block information in the block, that the block information is consistent with the transaction result of the simulated transaction.

Further, a ledger module in the fabric system is responsible for storing received block data in a specified database. In the present disclosure, the ledger forms, based on options of database types in a configuration file, an RDB storage structure-based object instance, parses the block data, and stores the block data in the RDB (a MYSQL is used as an example). A specific process is as follows.

During initialization of the ledger, instantiation performed based on a provider module supporting an RDB structure is selected, to generate a ledger object used to process the RDB structure.

The received block data is parsed, and storage data complying with an RDB storage structure is generated. Details are as follows. A statedb module parses data into a versionDB structure and a business relation structure, corresponding to the world_state and a business relation schema storage unit in the database, and generates an SQL statement for data storage. A blkstorage module decomposes data into a header structure, a data structure, and a metadata structure, corresponding to the block_header, the block_data, and a block_metadata storage unit in the database, and generates an SQL statement for data storage. A historydb module parses data into a historyDB structure and a business relation history structure, corresponding to the world_state_history and a business relation history schema storage unit in the database, and generates an SQL statement for data storage.

Using the ledger object, a database connector is invoked, the SQL statement generated in step 2 is executed, and the storage data complying with the RDB storage structure is stored into the RDB.

Figure 5:
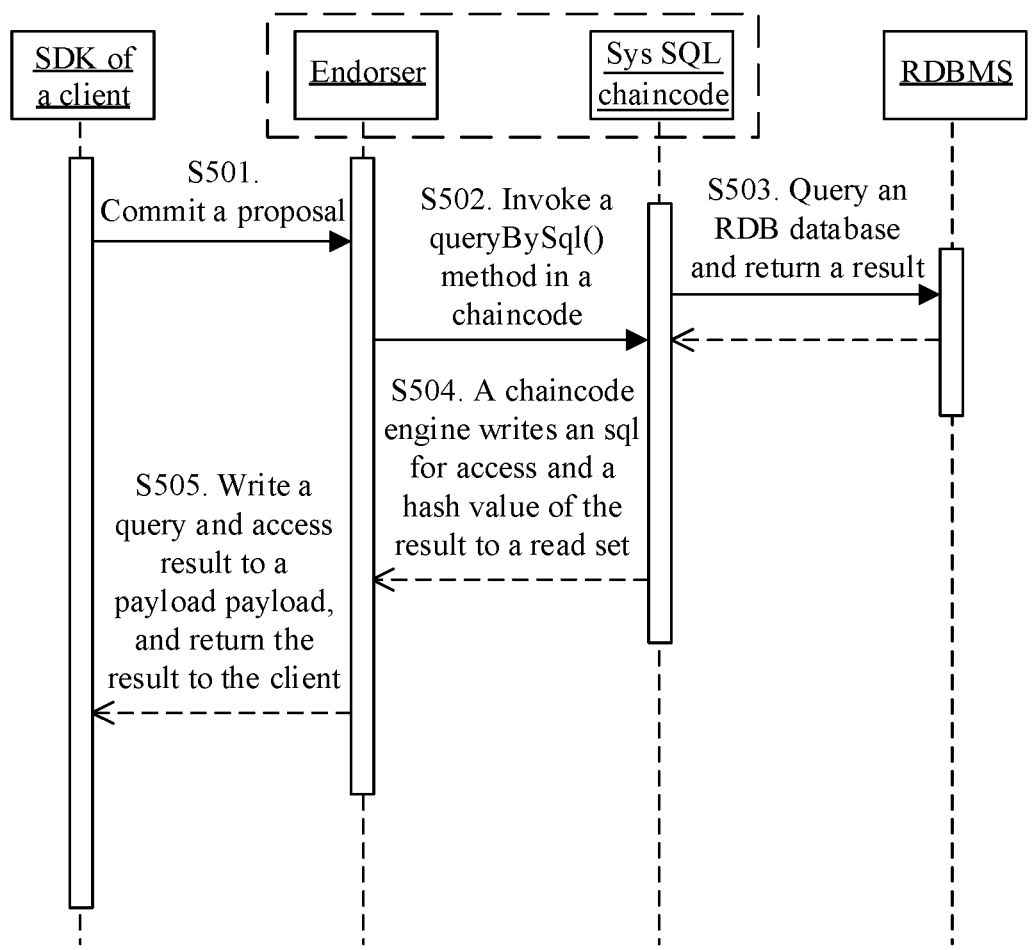
FIG. 5 is a timing diagram of a query method in a fabric system according to an embodiment of the present disclosure.

Referring to FIG. 5, in this embodiment, a client may further query block data using an SQL command. Details are as follows.

S501: An SDK of the client initiates an endorsement request of a transaction, where the transaction request includes an SQL query command, and is committed to an endorser.

S502: The endorser invokes a queryBySql( ) method in a chaincode based on method parameters in the transaction, and triggers a method for accessing an RDB in a chaincode engine.

S503: The chaincode engine queries and accesses the RDB.

S504: The chaincode engine writes an SQL for access and a hash value of a result to a read set.

S505: The endorser writes a query and access result to a payload, and returns the result to the client.

With reference to the foregoing embodiment, in another embodiment of the present disclosure, the present disclosure may be applied to another blockchain system. For example, in an Ethereum system, after initiating a transaction request, a client broadcasts the transaction request. A node in the blockchain system receives the transaction request, and simulates execution of a transaction. Further, a smart contract is invoked, an SQL parsing method is triggered, a KV in a particular data format is generated, and the KV is put in txpool, to store a result of the simulated transaction. In addition to the foregoing enumerated existing blockchain system, in other blockchain architectures that occur with development of technologies, an RDB may also be applied to the architectures with reference to the embodiments of the present disclosure, without departing from the protection scope of the present disclosure.

The methods in the embodiments of the present disclosure are described in detail above, and apparatuses in the embodiments of the present disclosure are provided below.

Figure 6:
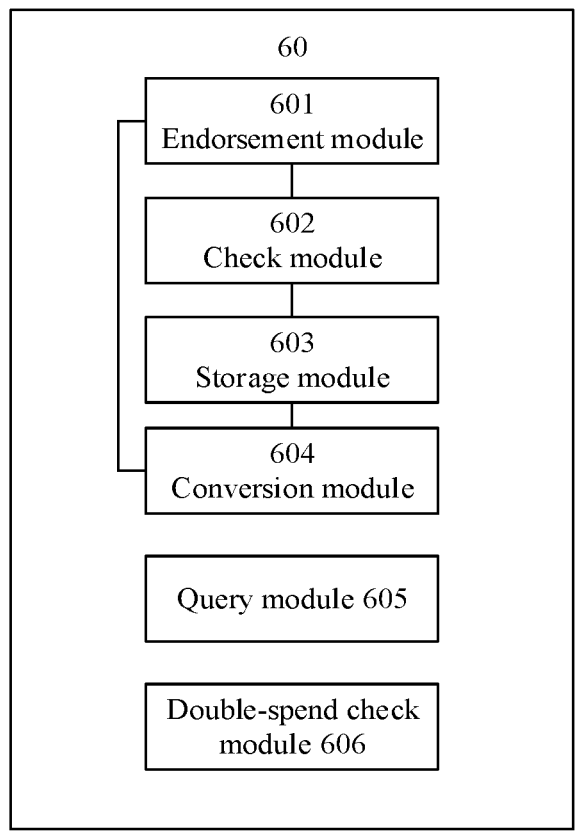
FIG. 6 is a diagram of a logical structure of implementation of a node in a blockchain system according to an embodiment of the present disclosure.

FIG. 6 is a schematic structural diagram of a blockchain node according to an embodiment of the present disclosure. The node may include a plurality of logical units, and each logical unit performs a corresponding function. The logical units are divided based on function and information exchange. It may be understood that the logical units may be implemented using software, or may be implemented using hardware, or may be separately implemented using different hardware, or may be implemented using common hardware. In addition, division of the logical units may also be adjusted based on different specific implementations, and the division manner in this embodiment is merely an example. In this embodiment, each unit is described in detail as follows.

An endorsement module 601 is configured to implement an endorsement function of a node. Further, the module obtains a transaction instruction that is of a client and that includes an SQL write command, and performs a simulated transaction based on transaction information in the transaction instruction.

For specific function implementation of the endorsement module, refer to steps S302, S303, and S304 in the foregoing embodiment.

In some implementations, the endorsement module determines, according to the transaction instruction, a first SQL query command used to obtain endorsement information, and instructs a relational RDB to execute the first SQL query command, and obtains a query result obtained after the RDB executes the first SQL query command, and performs the simulated transaction based on the transaction instruction and the query result.

In some implementations, the endorsement module determines whether endorsement information queried using an SQL query command meets a preset condition, and if the endorsement information meets the preset condition, executes the simulated transaction based on the transaction information in the transaction instruction.

In some other implementations, when executing the simulated transaction, the endorsement module needs to execute the simulated transaction based on both endorsement information queried using an SQL query command and the transaction information in the transaction instruction.

In some implementations, the endorsement module writes a transaction result of the simulated transaction to an RDB by generating the SQL write command, thereby completing an endorsement operation. In a specific implementation, the endorsement module generates an SQL write command of a transaction result of the simulated transaction using the SQL write command in the transaction instruction. In another specific implementation, the endorsement module generates an SQL write command of a transaction result of the simulated transaction using a KV obtained using a conversion module described below.

A check module 602 is configured to obtain block data, and check the block data based on the transaction result of the simulated transaction.

In some implementations, the check module is further configured to obtain the transaction instruction of the client, convert a first SQL write command into a KV using the conversion module, and check the KV.

For check steps, refer to the descriptions in steps S301 and S306 in the foregoing embodiment.

A storage module 603 is configured to generate a second SQL write command based on the block data after the check performed by the check module succeeds, and instruct the RDB to execute the second SQL write command.

In some implementations, the storage module writes received block data to the RDB using an SQL write command into which the block data is converted through execution of the conversion module. In a specific implementation, the storage module obtains block data information, converts, using the conversion module based on a KV in the block data information, the KV into a write command of a corresponding entry in the RDB, and instructs the RDB to execute the third SQL write command.

For specific function implementation of the storage module, refer to step S306 in the foregoing embodiment.

In some implementations, the node further includes the conversion module 604 configured to convert an SQL command into a KV, or configured to convert a KV into an SQL command. Further, in some implementations, when the module may convert the SQL write command in the transaction instruction into a KV when the endorsement module needs to generate, based on a KV, the query information for querying endorsement information, or generate, based on a KV, an SQL write command for writing the transaction result of the simulated transaction. In some other implementations, after receiving the block data, the module may also convert block data including a KV into an SQL write command, to store the block data in the RDB.

The function of the conversion module may be implemented using a smart contract deployed in the node. For specific implementation of the conversion module, refer to descriptions in S302 and S304 in the foregoing embodiment.

In some implementations, the node further includes a query module 605 such that the client queries stored block data or other data using an SQL query command. The query module is configured to obtain a query instruction that is of the client and that includes an SQL query command. The query module instructs, according to the query instruction, the RDB to execute a second SQL query command, and obtains a query result obtained after the RDB executes the SQL query command. When instructing the RDB to execute the SQL query command, the query module may directly send the SQL query command to the RDB for execution, or may generate a new query command according to the SQL query command of the client and instruct the RDB to execute the new query command.

In some implementations, the node further includes a double-spend check module 606, where the module is configured to perform a check that prevents a double-spend transaction. In an implementation, the double-spend check module may perform a check according to the transaction instruction. Further, the double-spend check module determines, according to the transaction instruction, a third SQL query command used to obtain historical transaction information corresponding to the transaction instruction, and instructs the RDB to execute the third SQL query command, and obtains a query result obtained after the RDB executes the third SQL query command, and determines, based on the query result of the third SQL query command, whether the transaction instruction is a double-spend transaction. In another implementation, the double-spend check module may further perform a check based on block information. Further, the double-spend check module determines, based on the block information, a third SQL query command used to query historical transaction information corresponding to a block, and instructs the RDB to execute the third SQL query command, and obtains a query result obtained after the RDB executes the third SQL query command, and determines, based on the query result of the third SQL query command, whether the transaction instruction is a double-spend transaction.

The example in this embodiment is a function module design example used when a node in a blockchain system achieves a technical effect of the present disclosure. Further, the technical effect may be achieved based on different blockchain systems. To be specific, each functional module in this embodiment may be implemented in different system architectures using a software module, a hardware module, or a combination of software and hardware modules. For example, referring to the example of the system architecture of the blockchain node in FIG. 2, all of the endorsement module, the conversion module, the check module, the query module, and the double-spend check module in the present disclosure may be implemented using the smart contract deployed in the smart contract unit, or may be implemented by adding a corresponding system function unit in the node. The storage module may be implemented using the storage unit, and interaction with another node may be implemented using a P2P network unit. For specific implementation of the node in this embodiment of the present disclosure in a specific blockchain system, refer to the specific implementation in the fabric system or the Ethereum system enumerated in the foregoing method embodiments. To be specific, implementation of the node in this embodiment of the present disclosure in various specific blockchain systems does not fall within the scope of the embodiments of the present disclosure.

Using the blockchain node in this embodiment of the present disclosure, the client in the blockchain system can directly initiate a transaction or query transaction information using an SQL language such that development difficulty of the client is reduced. In addition, the RDB is used for the blockchain node such that a query capability of the node database is improved, and a system that uses such a blockchain node can have stronger query and management capabilities for complex transaction data.

With development of technologies, design personnel almost all obtain a corresponding hardware circuit structure by programming an improved method process to a hardware circuit. Therefore, a method process may also be implemented using a hardware entity module. For example, a programmable logic device (PLD) (for example, a field-programmable gate array (FPGA)) is such an integrated circuit, and a logic function of the programmable logic device is determined by a user by programming a device. Design personnel program to "integrate" a digital system into one PLD without a need for a chip manufacturer to design and manufacture an application-specific integrated circuit chip. In addition, today, instead of manually making an integrated circuit chip, such programming is also mostly implemented using "logic compiler" software. The "logic compiler" software is similar to a software compiler used during program development and writing, and original code to be compiled is also written in a particular programming language that is referred to as a hardware description language (HDL). The HDL does not have merely one type, but has many types, such as an Advanced Boolean Expression Language (ABEL), an Altera Hardware Description Language (AHDL), Confluence, a Cornell University Programming Language (CUPL), HDCal, a JAVA Hardware Description Language (JHDL), Lava, Lola, MyHDL, PALASM, and a Ruby Hardware Description Language (RHDL). A very high-speed integrated circuit (VHSIC) Hardware Description Language (VHDL) and Verilog are most commonly used currently. A person skilled in the art should also be aware that, a hardware circuit that implements a logic method process can be easily obtained provided that logic programming is slightly performed on the method process using the foregoing several hardware description languages and the method process is programmed into an integrated circuit.

The modules or units described in the foregoing embodiment may be implemented by a computer chip or an entity, or may be implemented by a product having a function. In an existing blockchain system, there is a specific requirement on a computing capability and a network communication capability of a node. Therefore, a typical implementation device is a computer. Further, the computer may be, for example, a personal computer, a server, or a laptop computer. However, development of technologies brings continuous enhancement of a computing capability and a communication capability of a hardware device. Therefore, it can be predicted that, in future technical implementation, all of various hardware devices having a computing capability and a communication capability can be used as node devices in a blockchain system. For example, one or a combination of a cellular phone, a smartphone, a personal digital assistant, a media player, a vehicle-mounted computer, an internet of things device, a navigation device, a game device, a tablet computer, a wearable device may be used as a node device in the blockchain system.

For ease of description, the foregoing apparatus is divided into various units based on functions for separate description. Certainly, when this application is implemented, the functions of the units may be implemented in one or more pieces of software and/or hardware.

A person skilled in the art should understand that the embodiments of the present disclosure may be provided as a method, a system, or a computer program product. Therefore, the present disclosure may use a form of hardware only embodiments, software only embodiments, or embodiments with a combination of software and hardware. In addition, the present disclosure may use a form of a computer program product that is implemented on one or more computer-usable storage media (including but not limited to a disc memory, a compact disc (CD) read-only memory (ROM) (CD-ROM), an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device to generate a machine such that the instructions executed using a computer or a processor of another programmable data processing device generate an apparatus for implementing a specified function in one or more processes in the flowcharts and/or in one or more blocks in the block diagrams.

The computer program instructions may also be stored in a computer readable memory that can instruct a computer or another programmable data processing device to work in a specific manner such that the instructions stored in the computer readable memory generate an artifact that includes an instruction apparatus. The instruction apparatus implements a specified function in one or more processes in the flowcharts and/or in one or more blocks in the block diagrams.

The computer program instructions may also be loaded onto a computer or another programmable data processing device such that a series of operations and steps are performed on the computer or the other programmable device, to generate computer-implemented processing. Therefore, the instructions executed on the computer or the other programmable device provide steps for implementing a specified function in one or more processes in the flowcharts and/or in one or more blocks in the block diagrams.

Figure 7:
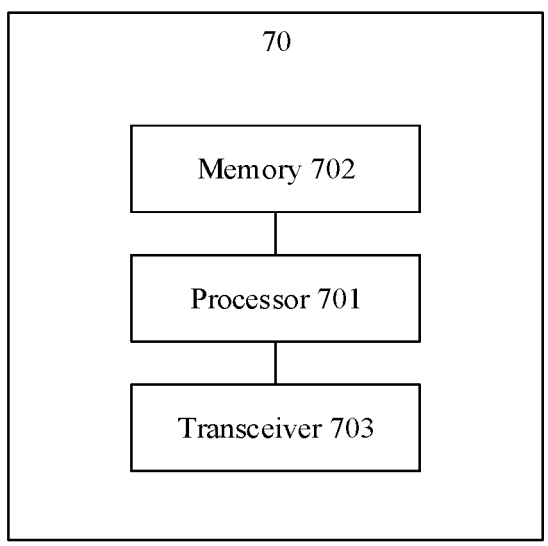
FIG. 7 is a diagram of a hardware structure of implementation of a node in a blockchain system according to an embodiment of the present disclosure.

In a typical configuration, FIG. 7 shows a node device 70 according to an embodiment of the present disclosure. The device 70 includes a processor 701, a memory 702, and a transceiver 703. The processor 701, the memory 702, and the transceiver 703 are connected to each other using a bus.

The memory 702 includes but is not limited to a random-access memory (RAM), aROM, an erasable programmable ROM (EPROM), or a portable ROM (i.e., CD-ROM). The memory 702 is configured to store a related instruction and related data. The transceiver 703 is configured to send and receive data with another node device or a client.

The processor 701 may be one or more central processing units (CPUs). When the processor 701 is one CPU, the CPU may be a single-core CPU, or may be a multi-core CPU.

The processor 701 in the device 70 is configured to read program code stored in the memory 702, to perform the method steps in the foregoing method embodiments or implement the function modules in the foregoing node embodiment. Therefore, for implementation of each operation of the node device in this embodiment, refer to the corresponding description in the method embodiments or node embodiment shown in FIG. 3, FIG. 4, FIG. 5, or FIG. 6.

A person of ordinary skill in the art may understand that all or some of the processes of the methods in the embodiments may be completed by a computer program instructing relevant hardware. The program may be stored in a computer readable storage medium. When the program is executed, the processes of the foregoing methods embodiments may be performed. The foregoing storage medium includes any medium that can store program code, such as a ROM or a RAM, a magnetic disk, or an optical disc.

The foregoing descriptions are merely specific implementations of the present disclosure, but the protection scope of the present disclosure is not limited thereto. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A blockchain transaction method comprising:

obtaining a transaction instruction of a client, wherein the transaction instruction comprises a first Structured Query Language (SQL) write command;

converting the first SQL write command into a key-value (KV) according to the transaction instruction;

obtaining, based on the KV, block data;

generating a second SQL write command based on the block data; and instructing a relational database (RDB) to execute the second SQL write command.

2. The blockchain transaction method of claim 1, wherein before obtaining the block data, the blockchain transaction method further comprises:

obtaining, according to the transaction instruction, a first SQL query command to obtain endorsement information;

instructing the relational database to execute the first SQL query command; and performing a simulated transaction based on the first SQL write command and the endorsement information.

3. The blockchain transaction method of claim 2, wherein performing the simulated transaction based on the first SQL write command and the endorsement information comprises performing, when the endorsement information meets a first preset condition, the simulated transaction according to the first SQL write command.

4. The blockchain transaction method of claim 2, wherein the endorsement information comprises information that is required by a transaction and that corresponds to the transaction instruction, and wherein performing the simulated transaction based on the first SQL write command and the endorsement information comprises performing the simulated transaction based on the information required by the transaction and the first SQL write command.

5. The blockchain transaction method of claim 1, wherein generating the second SQL write command based on the block data comprises:

obtaining a second KV in the block data; and converting the second KV into the second SQL write command based on a corresponding entry in the relational database.

6. The blockchain transaction method of claim 1, further comprising checking the KV to obtain a check result, wherein the check result indicates whether to perform a simulated transaction.

7. The blockchain transaction method of claim 6, wherein converting the first SQL write command into the KV according to the transaction instruction further comprises:

identifying, according to the first SQL write command, a K value corresponding to an entry indicated by the write command; and identifying, based on content of the entry, a V value corresponding to the K value.

8. The blockchain transaction method of claim 2, wherein identifying the first SQL query command to obtain the endorsement information comprises identifying, based on the KV, the first SQL query command.

9. The blockchain transaction method of claim 1, wherein before obtaining the block data, the blockchain transaction method further comprises:
- checking the KV; and
- performing a simulated transaction comprising:
  - identifying a third SQL write command based on the KV, wherein the third SQL write command writes a transaction result of the simulated transaction to the relational database; and
  - instructing the relational database to execute the third SQL write command.

10. The blockchain transaction method of claim 5, further comprising implementing a smart contract or at least one of converting the second KV into the second SQL write command of the corresponding entry in the relational database or converting the first SQL write command into the KV.

11. The blockchain transaction method of claim 1, wherein before obtaining the block data, the blockchain transaction method further comprises:
- checking the KV; and
- performing a simulated transaction comprising:
  - identifying a third SQL write command according to the first SQL write command, wherein the third SQL write command writes a transaction result of the simulated transaction to the relational database; and
  - instructing the relational database to execute the third SQL write command.

12. The blockchain transaction method of claim 1, further comprising:
- obtaining a query instruction of the client, wherein the query instruction comprises a second SQL query command;
- instructing, according to the query instruction, the relational database to execute the second SQL query command; and
- obtaining a query result after the relational database executes the second SQL query command.

13. A blockchain computer node comprising:
- a memory configured to store executable program instructions; and
- one or more processors coupled to the memory and configured to execute the program instructions to cause the blockchain computer node to:
  - obtain a transaction instruction of a client, wherein the transaction instruction comprises a first Structured Query Language (SQL) write command;
  - convert the first SQL write command into a key-value (KV) according to the transaction instruction;
  - obtain, based on the KV, block data;
  - generate a second SQL write command based on the block data; and
  - instruct a relational database (RDB) to execute the second SQL write command.

14. The blockchain computer node of claim 13, wherein before obtaining the block data, the one or more processors is further configured to execute the program instructions to cause the blockchain computer node to:
- check the KV; and
- perform a simulated transaction by:
  - identifying, according to the transaction instruction, a first SQL query command to obtain endorsement information;
  - instructing the RDB to execute the first SQL query command; and
  - performing the simulated transaction based on the endorsement information.

15. The blockchain computer node of claim 14, wherein the one or more processors is further configured to execute the program instructions to cause the blockchain computer node to perform the simulated transaction according to the first SQL write command when the endorsement information meets a first preset condition.

16. The blockchain computer node of claim 14, wherein the endorsement information comprises first information of a transaction corresponding to the transaction instruction, and wherein the one or more processors is further configured to execute the program instructions to cause the blockchain computer node to perform the simulated transaction based on the first information.

17. The blockchain computer node of claim 13, wherein the one or more processors is further configured to execute the program instructions to cause the blockchain computer node to check the KV to obtain a check result indicating whether to perform a simulated transaction.

18. The blockchain computer node of claim 13, wherein the one or more processors is further configured to execute the program instructions to cause the blockchain computer node to:
- identify, based on the KV, a third SQL write command to write a transaction result to the RDB; and
- instruct the RDB to execute the third SQL write command.

19. The blockchain computer node of claim 13, wherein the one or more processors is further configured to execute the program instructions to cause the blockchain computer node to:
- identify, according to the first SQL write command, a third SQL write command to write a transaction result to the RDB; and
- instruct the RDB to execute the third SQL write command.

20. A computer program product comprising computer-executable instructions stored on a non-transitory computer-readable storage medium that, when executed by one or more processors, cause an apparatus to:
- obtain a transaction instruction of a client, wherein the transaction instruction comprises a first Structured Query Language (SQL) write command;
- convert the first SQL write command into a key-value (KV) according to the transaction instruction;
- obtain, based on the KV, block data;
- generate a second SQL write command based on the block data; and
- instruct a relational database (RDB) to execute the second SQL write command.

* * * * *